United States Patent [19]

Faulkner et al.

[11] Patent Number: 5,144,669

[45] Date of Patent: Sep. 1, 1992

[54] METHOD OF COMMUNICATING DIGITAL SIGNALS AND RECEIVER FOR USE WITH SUCH METHOD

[75] Inventors: David W. Faulkner; Dianne M. Russ, both of Ipswich, England

[73] Assignee: British Telecommunications public limited company, London, England

[21] Appl. No.: 348,575

[22] PCT Filed: Sep. 9, 1988

[86] PCT No.: PCT/GB88/00744

§ 371 Date: Apr. 28, 1989

§ 102(e) Date: Apr. 28, 1989

[87] PCT Pub. No.: WO89/02681

PCT Pub. Date: Mar. 23, 1989

[30] Foreign Application Priority Data

Sep. 14, 1987 [GB] United Kingdom ............... 8721603
Feb. 26, 1988 [GB] United Kingdom ............... 8804552

[51] Int. Cl.$^5$ .................... H04L 9/00; H04L 7/00; H04J 3/06

[52] U.S. Cl. .................... 380/49; 380/10; 380/46; 380/47; 370/100.1; 370/107; 375/115; 375/120

[58] Field of Search ........... 380/7, 10, 46, 47, 49, 380/50, 48; 455/6; 370/77, 100.1, 107; 375/106, 115, 119, 120

[56] References Cited

U.S. PATENT DOCUMENTS

| | | | |
|---|---|---|---|
| 3,399,273 | 8/1968 | Vasseur | 380/49 X |
| 3,649,915 | 3/1972 | Mildonian, Jr. | 380/49 X |
| 3,666,889 | 5/1972 | Zegers et al. | 370/18 |
| 3,950,616 | 4/1976 | Tarmo | 375/114 |
| 4,052,565 | 10/1977 | Baxter et al. | 380/48 X |
| 4,221,005 | 9/1980 | Frosch | 375/1 |
| 4,221,931 | 9/1980 | Seiler | 380/49 X |
| 4,313,133 | 1/1982 | Fukushima | 380/7 |
| 4,656,629 | 4/1987 | Kondoh et al. | 455/6 X |
| 4,727,579 | 2/1988 | Wright et al. | 380/46 X |
| 4,866,773 | 9/1989 | Lubarsky | 380/48 |

FOREIGN PATENT DOCUMENTS 0036605 3/1981 European Pat. Off. .

OTHER PUBLICATIONS

Ntz Archiv, vol. 6, No. 5, May 1984, pp. 101–103, Berlin, DE; G. Teich: "A channel selection module for gigabit line access".

Links for the Future, 1984, pp. 790–795, IEEE/Elsevier Science Publishers B.V. (North-Holland); A. Stevenson et al.; "A 280 Mbit/s monomode optical trunk transmission system".

Robert B. Ward, "Acquisition of Pseudonoise Signals by Sequential Estimation" IEEE Transactions on Communication Technology, vol. COM-13, No. 4, pp. 475–483 (Dec. 1965).

Primary Examiner—Bernarr E. Gregory
Attorney, Agent, or Firm—Nixon & Vanderhye

[57] ABSTRACT

A receiver (2) for selectively extracting one of two or more time division multiplexed channels of digital signals, which channel has been scrambled before multiplexing using a predetermined digital sequence comprising: a clock means (4) arranged to provide clock pulses having a repetition rate dependent on a clock control signal; a digital sequence generator (10) triggered by each clock pulse to provide a generator signal representative of the next digit in the predetermined digital sequence; a sampling means (8) arranged to provide a sampled signal at the clock pulse rate; and a phase lock means (8, 18, 25, 26, 22, 4, 10) controlling the clock control signal whereby the generator sequence is delay-lockable to the sampled signal. The receiver finds particular application with the reception of digital video signals broadcast through a passive optical network.

16 Claims, 6 Drawing Sheets

METHOD OF COMMUNICATING DIGITAL SIGNALS AND RECEIVER FOR USE WITH SUCH METHOD

BACKGROUND AND SUMMARY OF THE INVENTION

This invention relates to a method of communicating digital signals and a receiver for use with such method particularly, but not exclusively, applicable to the communication of digital video signals via a passive optical network.

CATV systems have, to date, used analog transmission schemes because the cost of digital equipment and the bandwidth required for transmission is high but use of digital techniques in television receiver design is increasing with a/d conversion at the input to a single digital processing integrated circuit. Digital coders are now becoming available which have the potential for low-cost implementation and which provide a picture quality that compares favorably with off-air reception. Among the benefits of digital transmission to users are guaranteed picture quality, the possibility of adding new services to receivers equipped with more advanced digital signal processing, the elimination of the requirement for a/d conversion. Until now the extensive use of digital transmission has been limited by bandwidth and cost constraints of the copper network. However new, low-cost broadcast optical networks are emerging which allow a mixture of services to be provided by time domain or wavelength domain multiplexing (TDM or WDM) on an evolutionary basis. The speed limitation of the electronic components connected to the network rather than the network itself is now the limiting factor on the digital channel capacity per wavelength. Recent papers entitled 'Single mode optical networks' by Payne D. B. and Stern J. R. Proc. Globecom'85 and 'Technical Options for Single Mode Local Loops' TDM or WDM by Payne D. B. and Stern J. R. Proceedings of ECOC 1986, Barcelona have discussed the merits of multiple access local networks based upon passive optical networks which use power dividers to serve a large number of customers. These include the possibility of broadband transmission on a single carrier and upgrading via wave division multiplexing (WDM). Whilst WDM would provide one solution to this problem, TDM seems more attractive because only a single transmitter is required.

The passive, multiple-access architecture has a number of operational advantages as discussed in the paper on single mode optical networks referenced above. The need for cables with large number of fibers near the head end is reduced, it is more reliable and easier to maintain than a network with active switching at splitting nodes, and it is possible to upgrade the network as wavelength multiplexing components become available. These networks are most cost sensitive in the customers' final drop and equipment as the cost of the head-end is shared by all users. An objective of the present invention is to provide a method and a receiver for use with such a method whereby customers can access a large number of digital TV channels in a way which can reduce the cost of customer equipment by eliminating the need for digital circuitry operating at the multiplex rate.

It is a further object of the present invention to provide a method of signal communication and a receiver in which a level of security can be given to some or all of the multiplexed channels by scrambling prior to transmission and in which the channel selection and descrambling is carried out automatically by the receiver.

According to one aspect of the present invention there is provided a receiver for selectively extracting one of two or more time division multiplexed channels of digital signals, which channel has been scrambled before forming the multiplexed signal using a predetermined digital sequence comprises
  a clock means arranged to provide clock pulses having a repetition rate dependent on a clock control signal;
  a digital sequence generator means for providing a generator signal representative of the next digit in the predetermined digital sequence at the clock repetition rate;
  a sampling means arranged to provide a sample signal which is the multiplexed signal sampled at the clock pulse rate; and
  a phase lock means controlling the clock control signal whereby the generator sequence is phase-lockable to the sampled signal.

The scrambling and descrambling is preferably by XOR-ing with the scrambling and descrambling sequences as this tends to produce a balanced data signal. The delay lock means is arranged such that when there is no correlation between the sampled and generator signals the clock control signal produced causes the clock pulse repetition rate to be slightly different from (it can be above or below) the channel bit rate. There will therefore be phase slip between the sampled signal and the generator signal. When these streams coincide, a descrambled video channel is output. Additional circuitry is required to detect the presence of this video channel, so that the delay-lock loop may be closed. One method of achieving this is as follows.

The video channel contains long strings of zeros in the line blanking intervals, and these are detected using an 8-bit ECL serial/parallel converter with wired 'or' outputs. This produces a logical '0' output during the line blanking interval if the channel was scrambled prior to transmission by a sequence corresponding to the receiver's descrambling sequence. The descrambled signal is fed to a circuit designed to lengthen the zero level pulses. The change in signal level which occurs when this string of descrambled zeros is detected is integrated, altering the frequency of the VCXO to give delay-lock at the incoming channel rate.

Alternatively the delay lock means may comprise a comparison means providing an output signal representative of the XOR of the generator signal and the sampled signal and an averaging means arranged to provide the clock control signal such that the clock control signal is representative of the time-averaged d.c. component of the output signal. It will be clear that the above invention can be operated with logical 1s as well as logical 0s as the line blanking signal by the inclusion of inverters in the appropriate places.

Delay-lock occurs at the edge of the appropriate channel 'eye' pattern in the multiplex, where incoming data transitions provided a suitable reference point so the descrambled data in the delay-lock loop therefore is prone to errors. To achieve error-free operation of the video channel, it is preferred that the input data is also sampled by a second D-type bistable, clocked at the centre of the 'eye' pattern via a T/2 clock delay line.

This data is then descrambled independently using the locally generated PRBS.

Using this method of communication the receiver will automatically select a channel which has been scrambled by the same sequence as generated by the sequence generator in the receiver and at the same time automatically adjust the phase of the clock relative to that channel thereby obviating the need for a clock recovery system independent of the descrambler.

The demultiplexer selects a single channel using a sampler clocked at the channel rate with a phase determined by the delay-lock loop. A benefit of this method of demultiplexing is that clock recovery and time slot synchronization is achieved at the baseband rate enabling all the receiver electronics to operate at the channel rate. A further benefit is that the same channel selection technique operates independently of the number of channels up to the speed limitation of the sampler.

Conveniently, the digital sequence is provided by a dedicated pseudo-random sequence generator although alternative methods can be employed for example reading out a sequence stored in an EPROM or generating the sequence by a general purpose computer.

Preferably the pseudo-random sequence generator is a stream cipher.

According to another aspect of the present invention a method of communication is provided in which a transmitter transmits two or more time division multiplexed digital signals, one or more of which has been scrambled using a predetermined digital sequence, and selectively extracting the scrambled signal by means of a receiver according to the present invention.

According to a yet further aspect of the present invention a method of transmitting a digital signal is provided in which the digital signal is scrambled using a predetermined digital sequence and time division multiplexed with one or more other digital signals and the multiplexed signals transmitted to one or more receivers.

Various service protocols between the transmitter and the receivers to which the multiplexed channels are transmitted can be set up. In one arrangement the receiver is provided with means whereby the customer can alter the sequence generated by the sequence generator. This can be readily achieved by providing a pseudo-random sequence generator (PRSG) whose output is determined by a characteristic function which can be set by, for example switches, in known manner. The customer can then select one or more of the channels to be received by setting the characteristic function to that of the desired channel. By providing the customer with the means to set only a subset of the characteristic functions of the channels at his receiver he will be free to select a channel from that subset of channels only. The provider of the signals to the customer can alter the availability of channels to such a customer by choosing which channels are scrambled with the sequences available a particular customer. Each customer may have a fixed, unalterable set of available characteristic functions distinct from another customer yet they can receive the same data if the data is separately scrambled onto two separate channels using two different scrambling sequences.

BRIEF DESCRIPTION OF THE DRAWINGS

Embodiments of receivers and a method of communication according to the present invention will now be described, by way of example only, with reference to the accompanying drawings, in which.

DETAILED DESCRIPTION OF THE INVENTION

Figure 1:
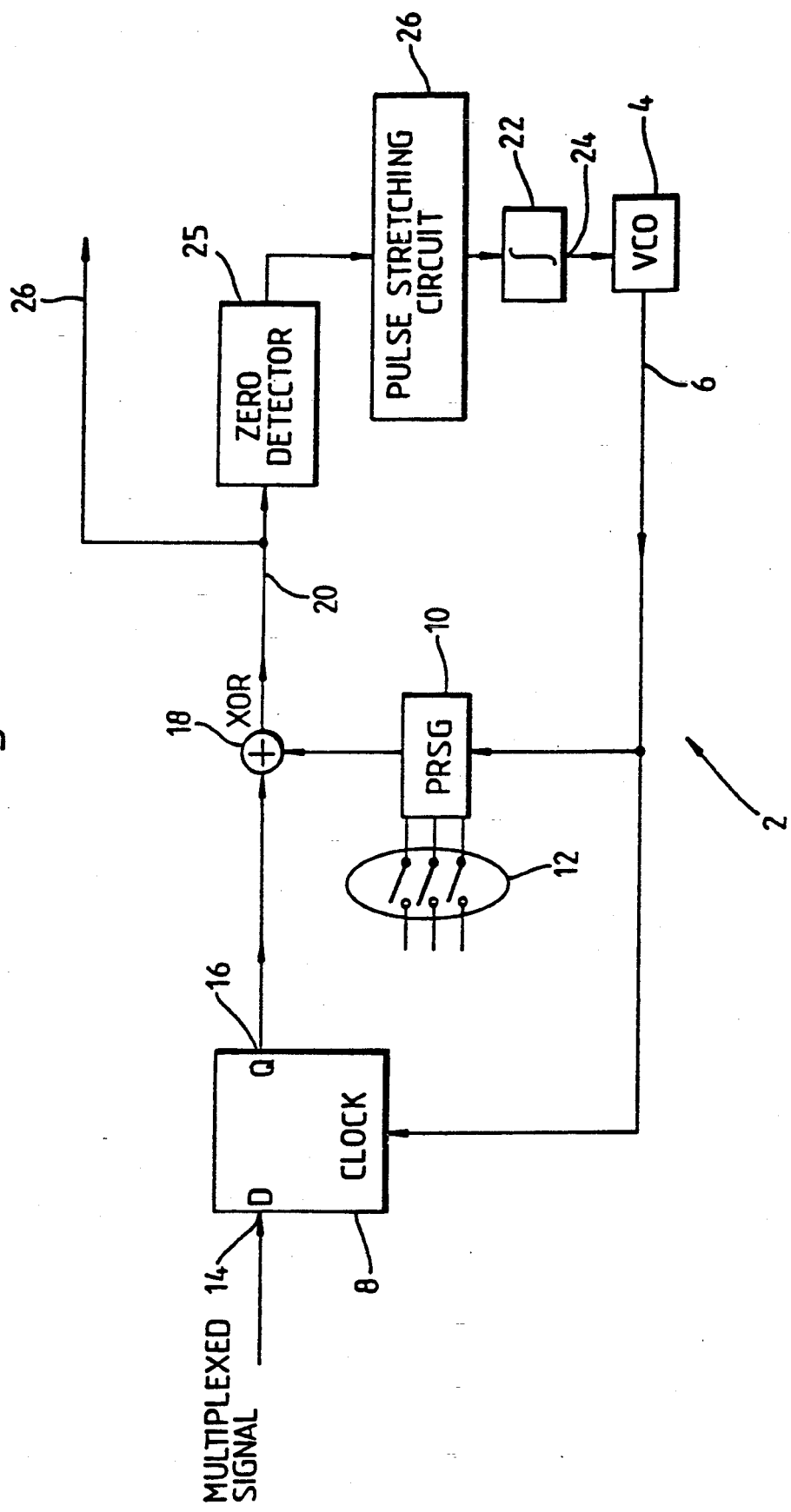
FIG. 1 is a schematic diagram of a delay-lock loop in accordance with the present invention.
Figure 2:
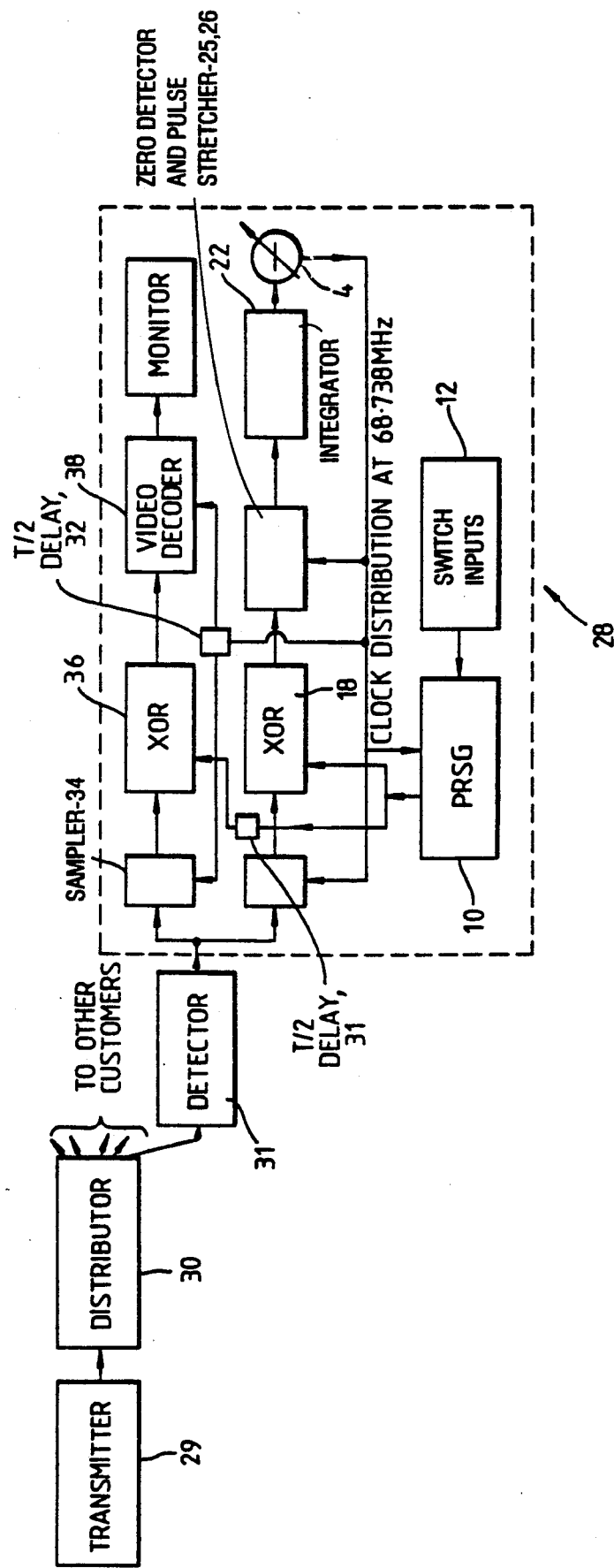
FIG. 2 is a block diagram of a receiver according to the present invention.

Referring to FIG. 1, a delay lock loop 2 comprises a voltage controlled oscillator (VCO) 4, constituting a clock means, providing clock pulse signals at an output 6 which clocks a conventinal ECL D-type bistable 8, constituting a sampling means, and a known stream cipher pseudo-random sequence generator 10 (PRSG) of conventional design. The output from the PRSG is dependent on a predetermined characteristic function represented by the switch inputs 12 to PRSG 10. PRSG can be selected via a conventional infra-red key pad (not shown), as used with domestic TV sets and VCR's, and is set to match that of the scrambler used to encode the input data. A multiplexed data signal received from a transmitter (as shown in FIG. 2) is input to the bistable 8 at its D input 14 which outputs from its Q output 16 a sampled signal sampled at the rate determined by the VCO 4 which provides the clock signals. An exclusive -OR (XOR) gate 18 compares the sampled signal from the bistable output 16 and the sequence from the PRSG 10 to provide an NRZ video signal at line 20. The presence of video is detected as from a descrambled string of zeros during the line blanking interval using an 8-bit ECL serial to parallel convertor with wired 'OR' outputs 25 as a zero detector. Pulses from this circuit are coupled to a pulse stretching circuit 26 and integrator 22 which provides at its output 24 an electrical signal representative of the time averaged output signal constituting the clock control signal.

The VCO 4 is arranged to have a start-up clock rate close but not equal to that of the bit rate of each of the incoming channels. Phase slip therefore occures between the received multiplexed signal and the output from the PRSG 10. The XOR gate 18 performs a continuous bit by bit comparison of the outputs from the bistable 16 and PRSG 10. When these outputs are the same and in phase, NRZ video is output from the XOR. This is detected by 25, 26 and 22 to provide an output, constituting the clock control signal, which changes the output frequency of the VCO 4 to achieve phase locking.

The receiver's PRSG output phase will slip through the channels in the received multiplexed signal until it phase locks to that channel scrambled by the same sequence as produced by the receiver's PRSG.

The inputs 12 to the PRSG are arranged to select the characteristic function of the PRSG 10 (and hence the channel to be descrambled) in a known manner. The PRSG sequences can clearly be obtainable by other means, for example reading out sequences stored in permanent or volatile memories, possibly under computer control. The descrambled channel can be obtained via output 26 from the XOR 18 but a preferred arrangement for improved reception is shown in FIG. 2 and will now be described.

Referring to FIG. 2, a receiver 28 incorporates the delay-lock loop 2 of FIG. 1 (the same elements being given the same reference numeral) receiving a multiplexed signal from a transmitter 29 via an optical distributor 30 and an optical detector 31. There is included a further sampler 34, exclusive 'OR' gate 36 and video decoder 38 driven by delayed clock and delay-locked sequence. In normal operations, delay-lock occurs at one edge of the input 'eye' pattern where incoming data transitions provide a suitable reference point. To obtain low error rates, the clock signal is delayed by a delay 32 by an interval T/2 to operate the additional sampler 34 at a time corresponding to the instant of optimum signal amplitude. This signal is then descrambled by XOR 36 and decoded by the video decoder 38 by conventional means.

The receiver was constructed using conventional ECL 100k and ECL III ICs. It could easily be integrated onto a single chip with approximately 300 logic elements, and a 70 MHz maximum clock rate. The ECL III bistable set up time is <300 ps, which is sufficient for 2.2 GBit/s transmissions.

Access to other transparent channels may be obtained using further samplers fed via an appropriate clock delay.

Figure 3:
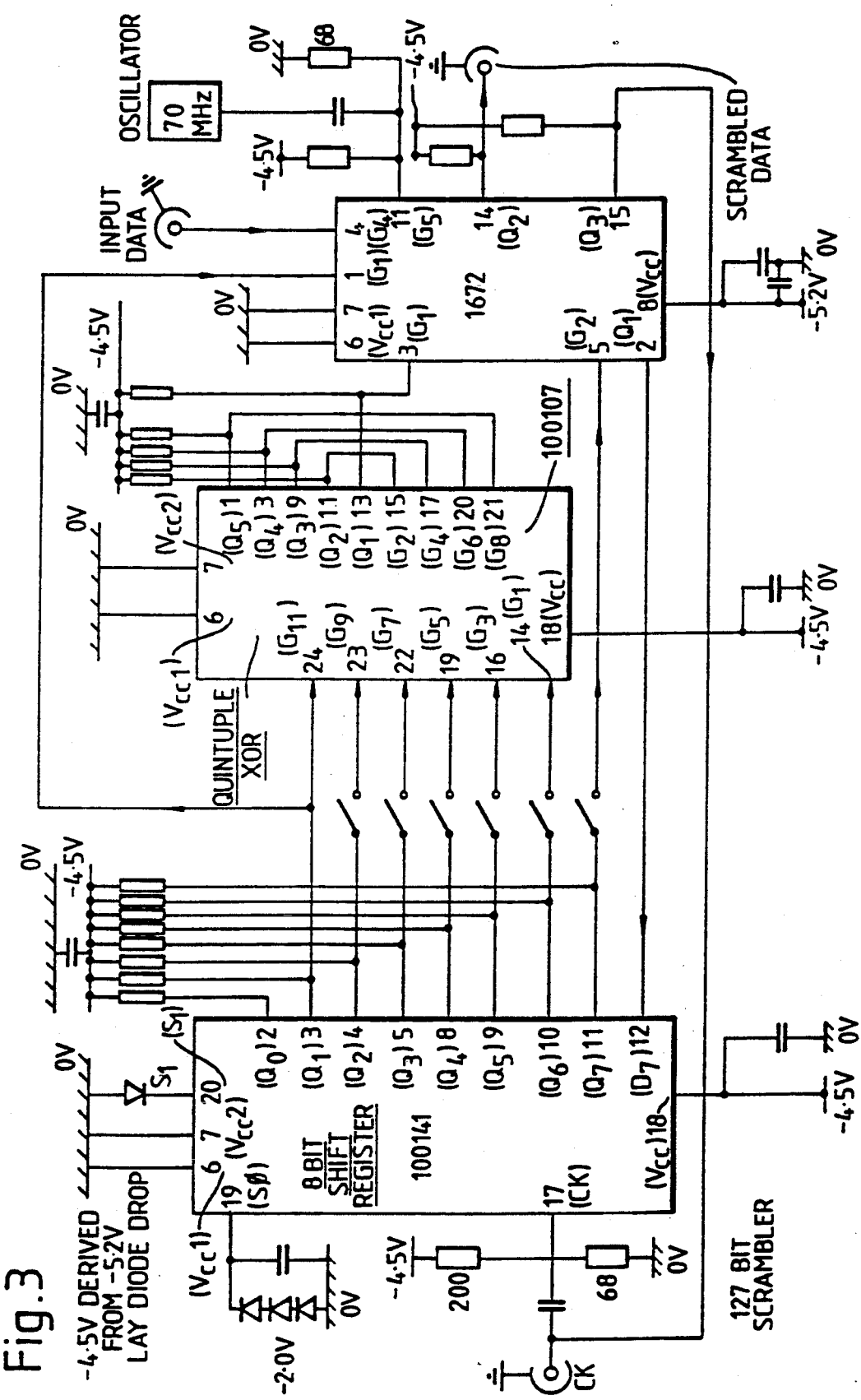
FIG. 3 is a circuit diagram of a PRSG scrambler suitable for use with the present invention.

Referring now to FIG. 3, there is shown the 127-bit stream cipher PRSG 10 configured for use in a transmitter to scramble a channel using standard electronic components which can also be used as the PRSG in the receiver of FIG. 1.

Figure 4:
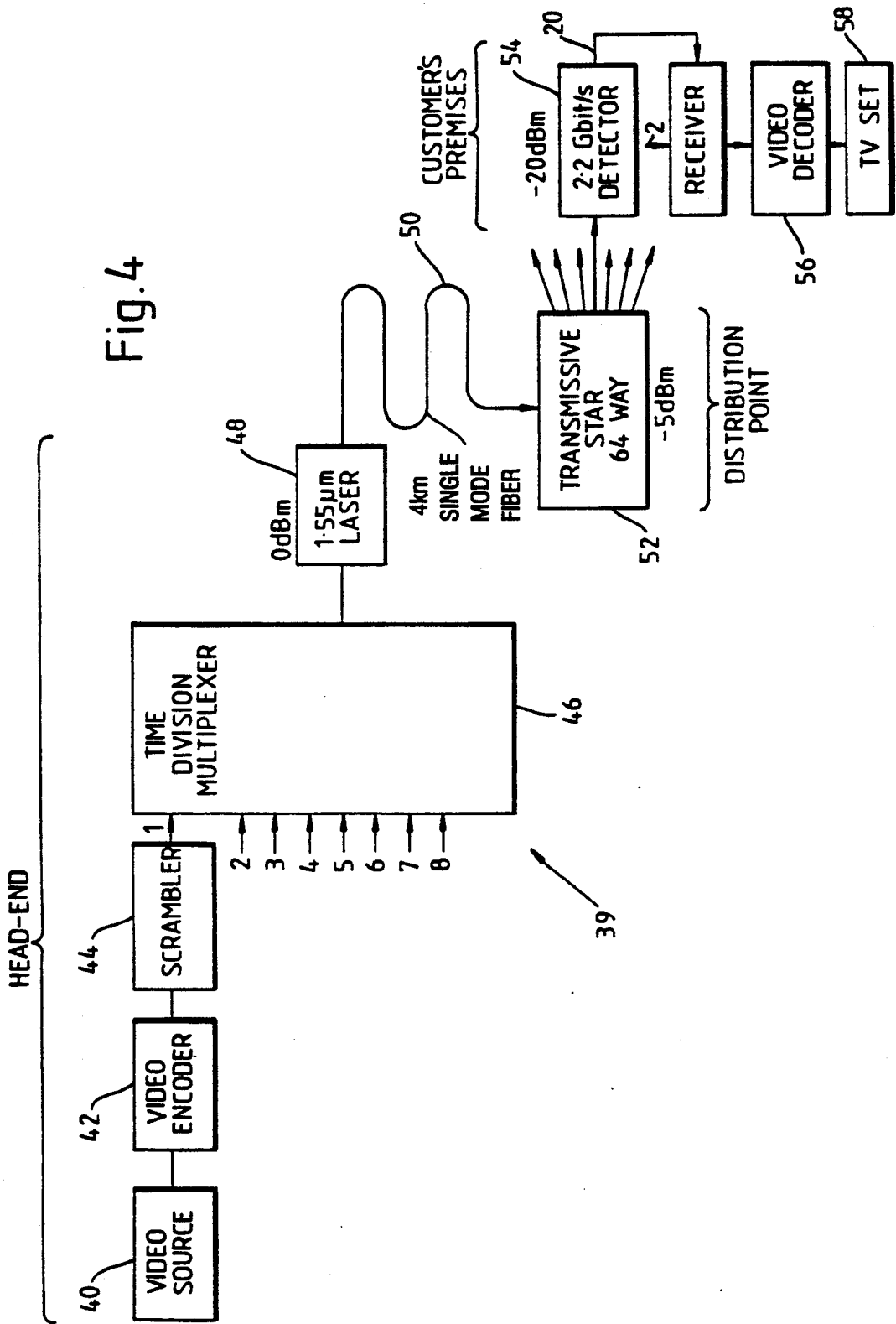
FIG. 4 is a block diagram of a TV communication system using the receiver of FIG. 2.

Referring now to FIG. 4 a T.V. communications system 39 comprises eight video sources 40, for example a T.V. camera, (only one of which is shown for clarity) each separately encoded by a video encoder 42 and scrambled by a scrambler 44 at the head or transmitter end of a TV communication system. The video encoders 42 give a serial transmission rate of 70 Mb/s. Video encoders giving a serial transmission rate of about 70 Mb/s can be achieved by reducing the composite PAL signal bandwidth to about 5 MHz, sampling at 11.2 MHz and using 6 bit codewords. A multiplexer 46 contains a clock divider which provides a synchronous clock source for the video encoders 42 and multiplexes the eight scrambled video channels to 2.2 GBd. The multiplexed channels are broadcast by modulating the output of a 1.55 um laser 48, injecting the optical signal into a single mode optical fiber 50 for transmission to 64 way transmissive star 52 in the form of fused biconical taper couplers.

The transmitter of the applicant encodes each channel prior to multiplexing which is a departure from the hitherto normal line transmission practice which is to use a single line encoder at the output of the multiplexer. Disadvantages of such single line encoding are that line encoding after multiplexing (at eight X 70 Mbit/s) is difficult and that the line decoding must be performed in the customers' premises before demultiplexing, both of which are also expensive.

One line code scheme that may be used is the known coded mark inversion (CMI). This is a biphase code which is simple and cheap to implement. One disadvantage of CMI is that it doubles the transmission rate but on the other hand the composite 1.12 GBd signal has the desirable properties of being both balanced and having a constrained maximum run length of 24 like elements.

Each customer of the 64 possible in this particular embodiment, of which only one is shown for clarity, receives the multiplexed channels at an optical detector 54 whose output is fed to a receiver 2 shown in FIG. 1. The descrambled signal is then passed to a video decoder 56 whose output drives a television 58.

A fairly high launch power is required to provide fan-out to a large number of customers and allow for losses in transmission. Semiconductor laser are available with launch levels of 0 dBm at 1.3 or 1.5 um into single mode fibre. Fan-out to customers can be provided using fused biconical taper couplers as described in the paper entitled "Wavelength flattened fused couplers" by Mortimore D.B. Electronics Letters 1985 Vol 21 no 17 pp 742–743. These could be a single array in a roadside cabinet or local distribution point, or distributed through the network. The suggested power budget is as follows:

launch power: 0 dBm
fiber loss: 5 dB
loss of a 64 way power divider: 20 dB
system margin: 4 dB
receiver sensitivity: −29 dBm The required sensitivity of detector 31 can be achieved with a germanium APD, PIN-FET with integrating front end, or a PIN-FET transimpedance receiver. A low-cost PIN-bipolar receiver has been found to provide adequate sensitivity for use with an eight way splitter.

Figure 5:
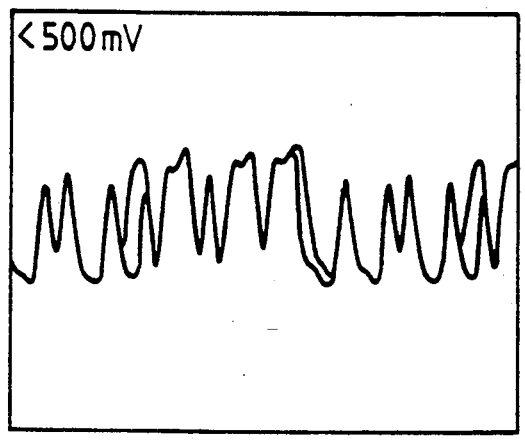
FIG. 5 shows a 2.2 GBIT/s multiplex measured on a real time oscilloscope with a transition time of about 350 ps.

FIG. 5 shows a 2.2 Gbit/s multiplex measured on a real time oscilloscope with a transition time of approximately 350 ps. This displays all 32 channels and shows the two active channels with open 'eye' patterns. An 'eye' measured on a sampling oscilloscope had a transition time of <75 ps. The time to acquire phase locking increases in proportion to the number of channels multiplexed. This was <500 ms for the 2.2 Gbit/s multiplex.

Figure 6:
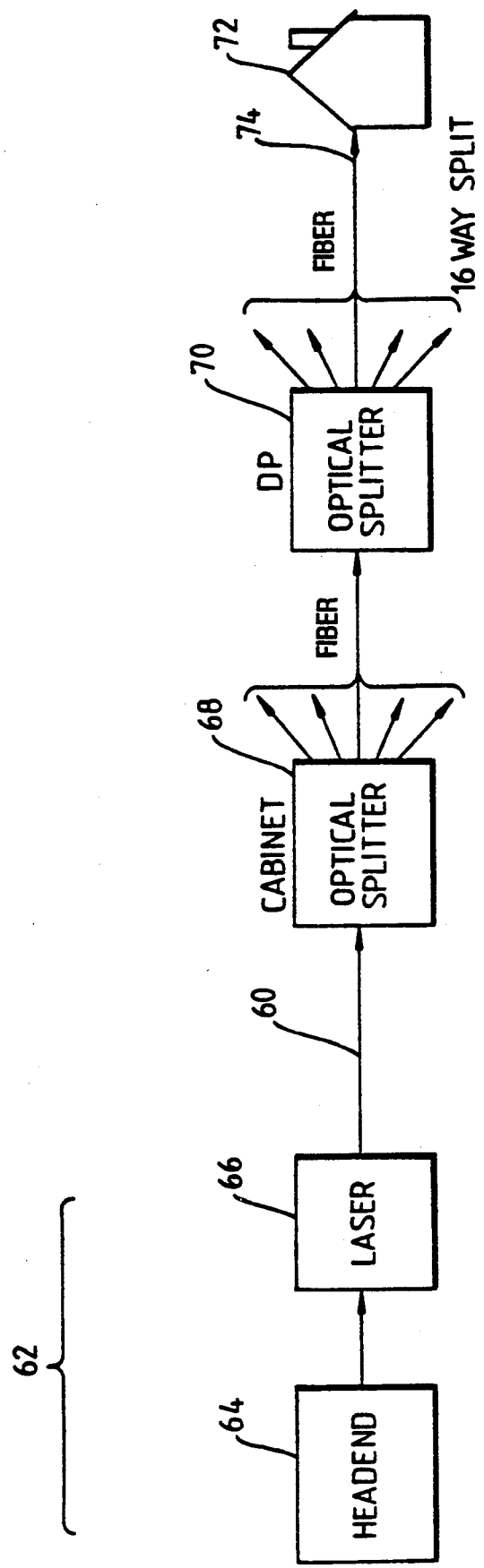
FIG. 6 illustrates an example of a distribution topology for the system.

FIG. 6 illustrates an example of a distribution topology. A single fiber 60 from the exchange 62 comprising a head-end 64 and laser transmitter 66 feeds a number of customers via passive optical splitters at the Cabinet and Distribution Point (DP) positions 68 and 70 respectively. Each customer 72 receives a fiber 74 (or alternatively coaxial cable) from a DP 70 and, via this, a TDM signal broadcast from the exchange 62. The customer's equipment accesses the particular channels in the TDM using the delay-lock loop channel selector according to the present invention.

Up to 32 channels can be multiplexed to provide service to 32 customers on such a topology within the power budget and speed limitations of existing receivers. Thus two DPs can be fed from a single fiber splitter at the cabinet and each customer can be offered a blend of services ranging from his own pre-selectable broad band (68.736 Mbit/s) channel to 32 separate broadcast channels. One of the more attractive options might be access to 16 broadcast channels plus up to 16 channels with material pre-selected at the head-end. Channels can be reserved for control, data transfer, and high quality audio services. In general, such channels will not have identifiers such as the line blanking intervals, and may need to be transparent to binary data. Access to a transparent channel is possible using a non-transparent channel as a reference and an additional sampler and clock delay set to offset the required amount to be locked to that channel.

Casual access to channels can be prevented by the design of the descramblers in customers' equipment which access time slots using unique descrambling sequences. To ensure that customers only descramble authorised channels it would be necessary for operating companies to maintain control of the key polynomials.

Figure 7:
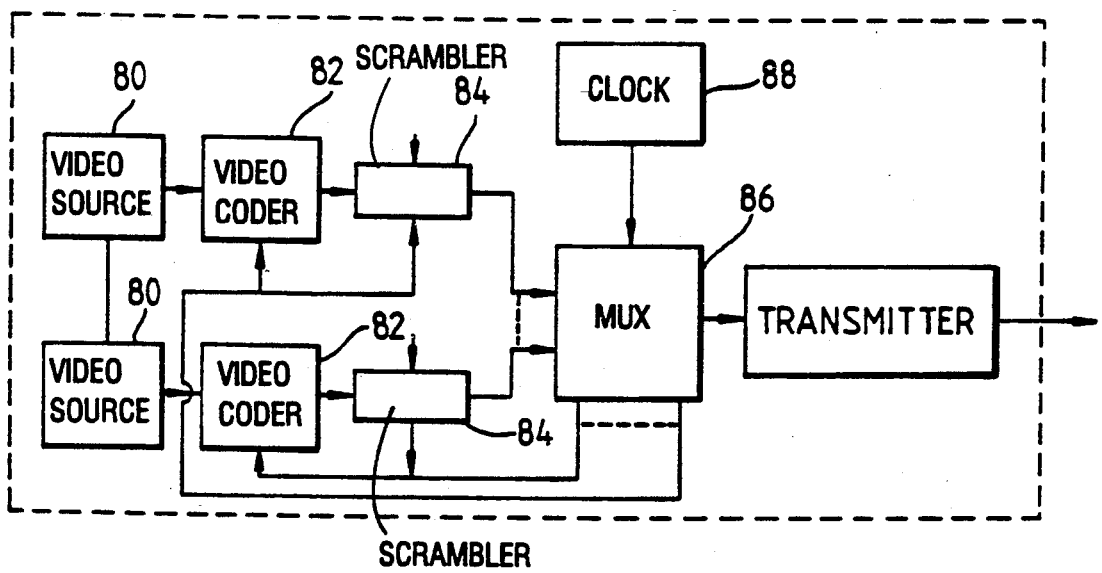
FIG. 7 shows in detail the head end for transmitting channels for use with the present invention.

FIG. 7 shows in detail a head-end for transmitting channels for use with the present invention which comprises N analogue video sources 80. These are individually coded by video coders 82 by reducing the composite PAL signal bandwidth to about 5 MHz, sampling at 11.2 MHz, and using 6 bit codewords to give a channel rate of 68.736 MHz. Each line blanking interval in the video signal is encoded as a string of 128 zeros. Each channel is then scrambled by scramblers 84, with its own unique sequence, providing channel identification. The channels are then multiplexed by multiplexer 86 together to give a line rate of N×68.736 MHz. Combinations of silicon and GaAs technology have been used to provide 4,8,16 and 32 video channels at 275, 550, 1100 and 2200 MHz, to demonstrate the flexibility of the receiver design. The multiplexer, driven at N×68.736 MHz, provides clock fan-out to each channel at 68.736 MHz.

The present invention can be used as a video demultiplexer and descrambler capable of recovering a designated video channel from a TDM, irrespective of the number of channels presented, up to the limit of the set-up time of the input bistable.

A broadcast optical network has been developed by the applicant over which eight video channels have been broadcast using 1.12 GBd synchronous time division multiplexing (TDM). A single laser can serve 64 terminals via passive optical splitters over such a network which if employed with simple demodulation technique should provide low-cost video distribution. This technique opens up opportunities for a number of new digital video distribution system options. A new range of all-digital video receivers can be envisaged, with channel selection operating in the time domain, in a manner analogous to the conventional frequency domain.

The receiver specifically described above requires a string of logical zeros in the pre-scrambled channel to provide a scrambler sequence in the transmitted signal to which the receiver can phase lock. This occurs in the blanking intervals of pulse code modulated video signals and so the invention is applicable, but not restricted, to use with the video channels. If it is required to send non-video channels which do not have the equivalent of blanking intervals, these may have strings of zeros inserted before scrambling or be accessed as transparent channels as noted above.

Means may be provided for temporarily setting the clock control signal to a value such that the clock in the receiver will be made to phase slip from the channel to which it is in phase. This will start the receiver scanning through the remaining channels. Thus if the customer has a receiver with an unalterable PRSG he can still tune into several channels if each is scrambled with a corresponding scrambler sequence as he can start the receiver scanning and it will continue to scan until the next appropriately scrambled signal comes into phase.

It will be appreciated that the level of security is not high as the descrambling sequence necessarily forms a significant portion of the channel signal to allow channel selection. This will not be a disadvantage for applications where high security is not a requirement.

The PRSG is preferably a stream cipher sequence generator but other scrambling methods in which the scrambling sequence appears on the scrambled channel to which the receiver can phase lock its internally generated descrambler sequence can be used.

In another arrangement of receiver according to the present invention in which higher security is obtained the channel has a signal structure comprising a predetermined sequence as produced by a PRSG or read out of a suitable memory element. In such a system the receiver has an additional sampler and a decoder operating on another time slot via a suitable clock delay. This additional decoder could be of the self synchronizing type and could make use of high order prime polynomials. Other combined scrambling and encoding schemes are envisaged, to give still higher levels of security eg public key encrypted signals.

If the channel to be scrambled has large components of strings of binary '1's, the scrambler sequence will appear as its complement on the scrambled channel when XOR-ed with it. A receiver according to the present invention in which one of the generator signal or the sampled signal to the XOR gate is inverted will phase lock to the channel in the manner above described. The descrambled signal is then obtainable from a further XOR gate which separately combines the sampled signal with the generator sequence.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A receiver for receiving a time division multiplexed signal comprising two or more time division multiplexed channels of digital signals and for selectively extracting a signal constituting one of the two or more time division multiplexed channels of digital signals, the signal constituting said one channel having been scrambled before forming the multiplexed signal using a predetermined digital sequence, said receiver comprising:
   a clock means arranged to provide clock pulses having a clock pulse repetition rate dependent on a clock control signal;
   a digital sequence generator means for providing a generator signal representative of the predetermined digital sequence at the clock pulse repetition rate;
   a first sampling means arranged to provide a sampled signal which is the received multiplexed signal sampled at the clock pulse repetition rate; and
   a phase lock means controlling the clock control signal whereby, in use, the generator signal is phase-locked to the sampled signal.

2. A receiver as claimed in claim 1 in which the phase lock means comprises a comparison means providing an output signal representative of the generator signal XORed with the sampled signal, which output signal has a d.c. component, a signal detector coupled to receive the output signal of the comparison means, and an averaging means arranged to provide the clock control signal such that the clock control signal is representative of the time average of the d.c. component of the output signal of the comparison means.

3. A receiver as claimed in claims 1 or 2 including means for deactivating the phase lock means thereby causing the generator signal to phase slip relative to the received multiplexed signal.

4. A receiver as claimed in claims 1 or 2 including a transparent channel sampler driven by a further clock signal which is time delayed from the clock pulses from the clock means.

5. A method of communication comprising:
transmitting a time division multiplexed signal comprising two or more time division multiplexed channels of digital signals in which a transmitter transmits said two or more time division multiplexed digital signals,
scrambling prior to transmission the signal on at least one of the channels using a predetermined digital sequence,
receiving at a receiver as defined in any one of claims 1 or 2 the transmitted multiplexed signal, and
selectively extracting the scrambled signal by the receiver.

6. A receiver as claimed in claim 2 in which the signal detector is a logical zero detector.

7. A receiver as claimed in claim 2 in which the phase lock means is arranged to lock to the line blanking interval of a video channel.

8. A receiver as claimed in claims 1, 2 or 7 including a second sampling means arranged to provide a sample signal which is the received multiplexed signal sampled at the clock pulse repetition rate at times delayed with respect to the first sampling means.

9. A receiver as claimed in claim 1 in which the digital sequence is provided by a pseudo-random sequence generator.

10. A receiver as claimed in any one of claims 1, 2 and 9 and further comprising a self synchronizing descrambler.

11. A receiver as claimed in claims 1, 2 or 9 including a setting means whereby the characteristic function of the pseudo-random sequence generator can be manually set.

12. A receiver as claimed in claim 11 in which the setting means is controlled by the received multiplexed signal.

13. A receiver as claimed in claim 12 including means for deactivating the phase lock means thereby causing the generator signal to phase slip relative to the received multiplexed signal.

14. A receiver as claimed in claim 12 including a transparent channel sampler driven by a further clock signal which is time delayed from the clock pulses from the clock means.

15. A method of communication comprising:
transmitting a time division multiplexed signal comprising two or more time division multiplexed channels of digital signals in which a transmitter transmits said two or more time division multiplexed digital signals,
scrambling prior to transmission the signal on at least one of the channels using a predetermined digital sequence,
receiving at a receiver as defined in claim 12 the transmitted multiplexed signal, and
selectively extracting the scramble signal by the receiver.

16. A method of transmitting a digital signal comprising:
scrambling the digital signal using a predetermined digital sequence, time division multiplexing said scrambled digital signal with at least one other digital signal which has been scrambled using a respective predetermined digital sequence, and
transmitting the multiplexed signals to one or more receivers.

* * * * *